(12) United States Patent  
Porte

(10) Patent No.: US 7,926,261 B2  
(45) Date of Patent: Apr. 19, 2011

(54) TURBOFAN PROVIDED WITH A PRE-COOLER

(75) Inventor: Alain Porte, Colomiers (FR)

(73) Assignee: Airbus France, Toulouse (FR)

( * ) Notice: Subject to any disclaimer, the term of this patent is extended or adjusted under 35 U.S.C. 154(b) by 389 days.

(21) Appl. No.: 12/067,931

(22) PCT Filed: Sep. 13, 2006

(86) PCT No.: PCT/FR2006/002091  
§ 371 (c)(1),  
(2), (4) Date: Mar. 24, 2008

(87) PCT Pub. No.: WO2007/034050  
PCT Pub. Date: Mar. 29, 2007

(65) Prior Publication Data  
US 2008/0230651 A1    Sep. 25, 2008

(30) Foreign Application Priority Data  
Sep. 26, 2005  (FR) ..................... 05 09791

(51) Int. Cl.  
*F02K 3/02*        (2006.01)

(52) U.S. Cl. ............. 60/266; 60/226.1; 60/728; 60/782

(58) Field of Classification Search ........... 60/226.1, 60/262, 266, 728, 782, 785, 795  
See application file for complete search history.

(56) References Cited

U.S. PATENT DOCUMENTS

| 3,486,435 A | | 12/1969 | Holt | |
|---|---|---|---|---|
| 3,842,597 A | * | 10/1974 | Ehrich | 60/226.1 |
| 4,474,001 A | | 10/1984 | Griffin | |
| 5,123,242 A | * | 6/1992 | Miller | 60/226.1 |
| 5,203,163 A | * | 4/1993 | Parsons | 60/226.1 |
| 5,269,135 A | | 12/1993 | Vermejan | |
| 5,729,969 A | | 3/1998 | Porte | |
| 5,732,547 A | * | 3/1998 | Olsen et al. | 60/204 |
| 5,918,458 A | * | 7/1999 | Coffinberry et al. | 60/785 |
| 6,035,627 A | * | 3/2000 | Liu | 60/785 |
| 6,134,880 A | * | 10/2000 | Yoshinaka | 60/226.1 |
| 7,607,308 B2 | * | 10/2009 | Kraft et al. | 60/785 |
| 7,716,913 B2 | * | 5/2010 | Rolt | 60/266 |
| 2007/0245739 A1 | * | 10/2007 | Stretton et al. | 60/728 |

FOREIGN PATENT DOCUMENTS

EP        0 469 825        2/1992

OTHER PUBLICATIONS

International Search Report dated Jan. 24, 2007 w/ English translation.  
Written Opinion of the ISA w/ English translation.

* cited by examiner

*Primary Examiner* — Michael Cuff  
*Assistant Examiner* — Phutthiwat Wongwian  
(74) *Attorney, Agent, or Firm* — Dickinson Wright PLLC

(57) ABSTRACT

The invention is a turbofan provided with a pre-cooler. In order to evacuate the heated cool air stream, at least one discharge pipe is arranged in a chamber and connects the pre-cooler to at least one discharge orifice provided in the inner fairing, in output of an exhaust nozzle and at least more or less opposite the wing.

10 Claims, 4 Drawing Sheets

TURBOFAN PROVIDED WITH A PRE-COOLER

TECHNICAL FIELD OF THE INVENTION

The present invention relates to a bypass turbine engine provided with a pre-cooler.

BACKGROUND OF THE INVENTION

It is known that, on board an aircraft, it is necessary to have hot air available to perform certain functions, such as air conditioning in the cockpit and the passenger cabin or for deicing certain parts of the aircraft.

It is also known that this hot air is taken from the turbojet engines of the aircraft and has to be cooled significantly before it can be used. To do this, a heat exchanger is provided, this generally being known as a pre-cooler, in which the hot air bled from the central generator of the turbojet engine is cooled by cold air from the fan duct.

Of course, during this heat exchange process, not only is the hot air bled from the central generator cooled by the cold air of the fan duct, but also this cold air is heated up by said hot air. It is therefore necessary to discharge this heated cold air to the outside.

In general, this heated cold air is discharged to the outside at the upper part of the engine suspension pylon, in front of the leading edge of the wind structure, and this leads to turbulence and aerodynamic disturbances that increase the drag of the aircraft.

To avoid this disadvantage, American document U.S. Pat. No. 5,729,969 proposes discharging the heated cold air into the annular cross section chamber formed between the central hot stream generator and the inner fairing of the fan duct, which chamber is then equipped with at least one ejection orifice directed toward said cold stream. However, an arrangement such as this carries the risk of disturbing the thermal regulation of the hot stream generator and therefore of accelerating turbine engine wear.

SUMMARY OF THE INVENTION

It is an object of the present invention to remedy the disadvantages of the prior art.

To these ends, according to the invention, the bypass turbine engine for an aircraft comprising:
  a hollow nacelle of longitudinal axis provided with an air inlet at the front and with a jet pipe at the rear;
  a central hot-stream generator, positioned axially in said nacelle;
  a fan positioned in said nacelle forward of said central generator and able to generate the cold stream for said turbine engine;
  an outer fairing borne internally by said nacelle and an inner fairing surrounding said central generator, said outer and inner fairings between them forming a fan duct of annular cross section for said cold stream, said inner fairing delimiting with said central generator a chamber of annular cross section surrounding said central generator; and
  a pre-cooler receiving a current of hot air bled from said central generator and a current of cold air bled from said cold stream so as to generate a current of cooled hot air intended for performing functions on board the aircraft, such as air conditioning or deicing, said pre-cooler at the same time generating a current of heated cold air, is notable in that, in order to discharge said current of heated cold air it comprises at least one discharge pipe positioned in said chamber and connecting said pre-cooler to at least one discharge orifice made in said inner fairing where said jet pipe leaves the nacelle, and facing upward at least approximately toward said wing.

Thus, by virtue of the present invention, said heated cold air is discharged into said cold stream at the exit from said turbine engine—and therefore without causing turbulence and aerodynamic disturbances and without disturbing said cold stream inside the fan duct—while at the same time being isolated from the atmosphere in said chamber by said discharge pipe—and therefore without disrupting the thermal regulation of said central hot stream generator.

Furthermore, it will be noted that said discharge orifice thus lies in the upper region of the turbine engine which is intentionally devoid of any equipment so as to prevent any fire in the turbine engine from spreading to the wing of the aircraft through said suspension pylon. It is therefore advantageous for said discharge pipe to be housed at least in part in the upper part of said chamber. It will also be noted that positioning said heated cold air discharge pipe in the upper region of said turbine engine does nothing to exacerbate the situation should the turbine engine catch fire. In any event, this discharge pipe may advantageously be made of a refractory material able to withstand high temperatures, for example a ceramic of said turbine engine.

In the usual way, said pre-cooler may also be positioned in the upper part of said turbine engine. However, by virtue of said discharge pipe, it may be housed in numerous other different locations of said turbine engine.

For example, in the known way, said pre-cooler may be positioned in the fan duct. It may then be immersed in the cold stream from the fan and experience the direct action of this stream. As an alternative, a scoop may be provided carrying some of said cold stream to said pre-cooler. This alternative form is particularly advantageous because it allows a regulating valve to be positioned between said scoop and said pre-cooler, so that the temperature of the current of cooled hot air can be regulated, at least in part, by adjusting the intake of cold air into the pre-cooler.

In another embodiment, said pre-cooler may be positioned in said chamber surrounding the central generator. In this case, in order to carry the current of cold air to said pre-cooler, at least one bleed pipe is provided, this being positioned at least partially in said chamber and connecting said pre-cooler to at least one bleed orifice made in said inner fairing. It is then advantageous for said bleed orifice to be equipped with a scoop for bleeding cold air from said cold stream.

An embodiment such as this has the advantage that a regulating valve can be mounted on said bleed pipe to allow, at least partial, regulation of the temperature of the current of hot air cooled by the intake of cold air into said pre-cooler.

BRIEF DESCRIPTION OF THE DRAWINGS

The figures of the attached drawing will make it easy to understand how the invention may be embodied. In these figures, identical references denote elements that are similar.

DETAILED DESCRIPTION OF THE INVENTION

Figure 1:
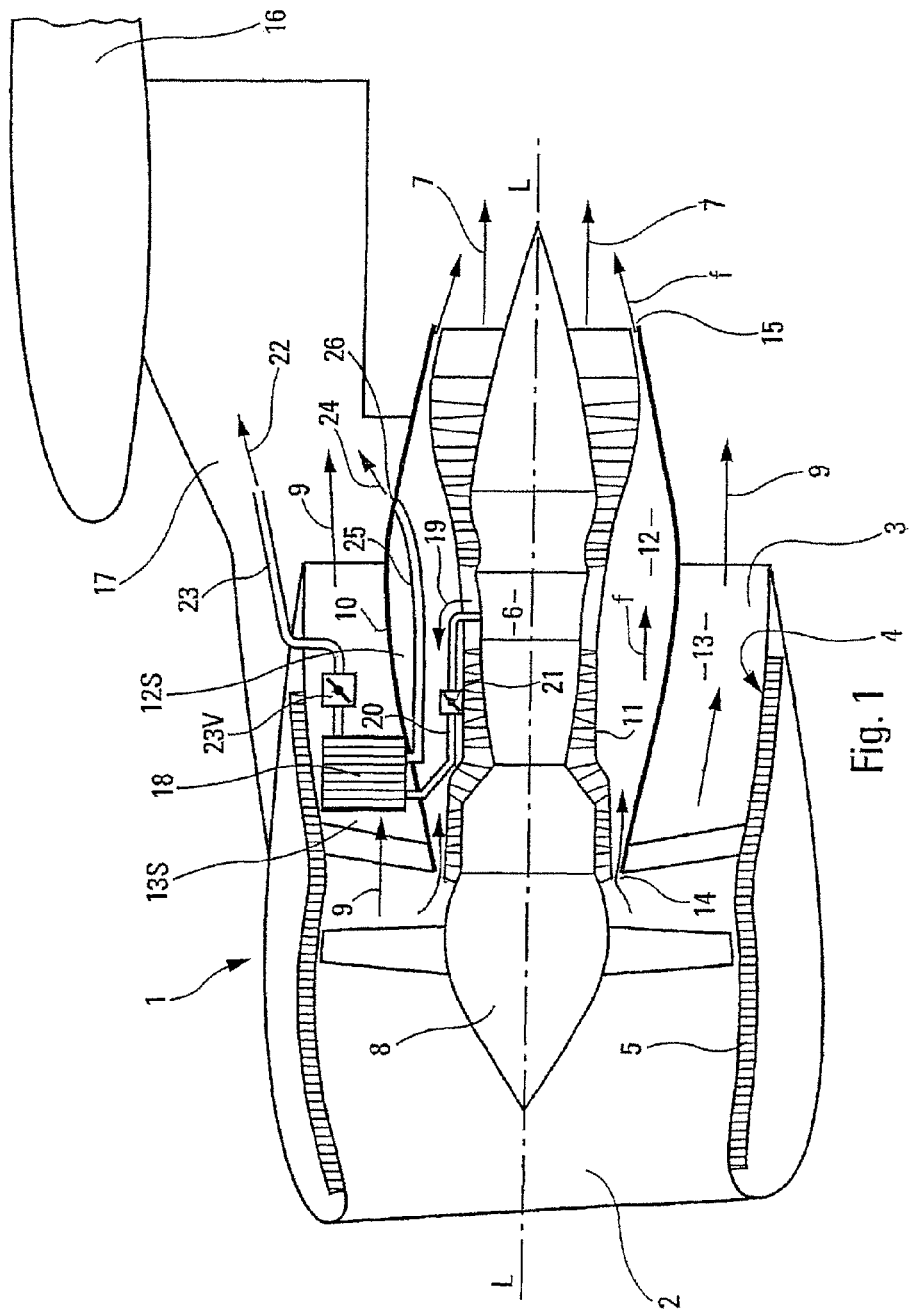
FIG. 1 illustrates, in schematic axial section, a first embodiment of the bypass turbine engine according to the present invention.
Figure 3:
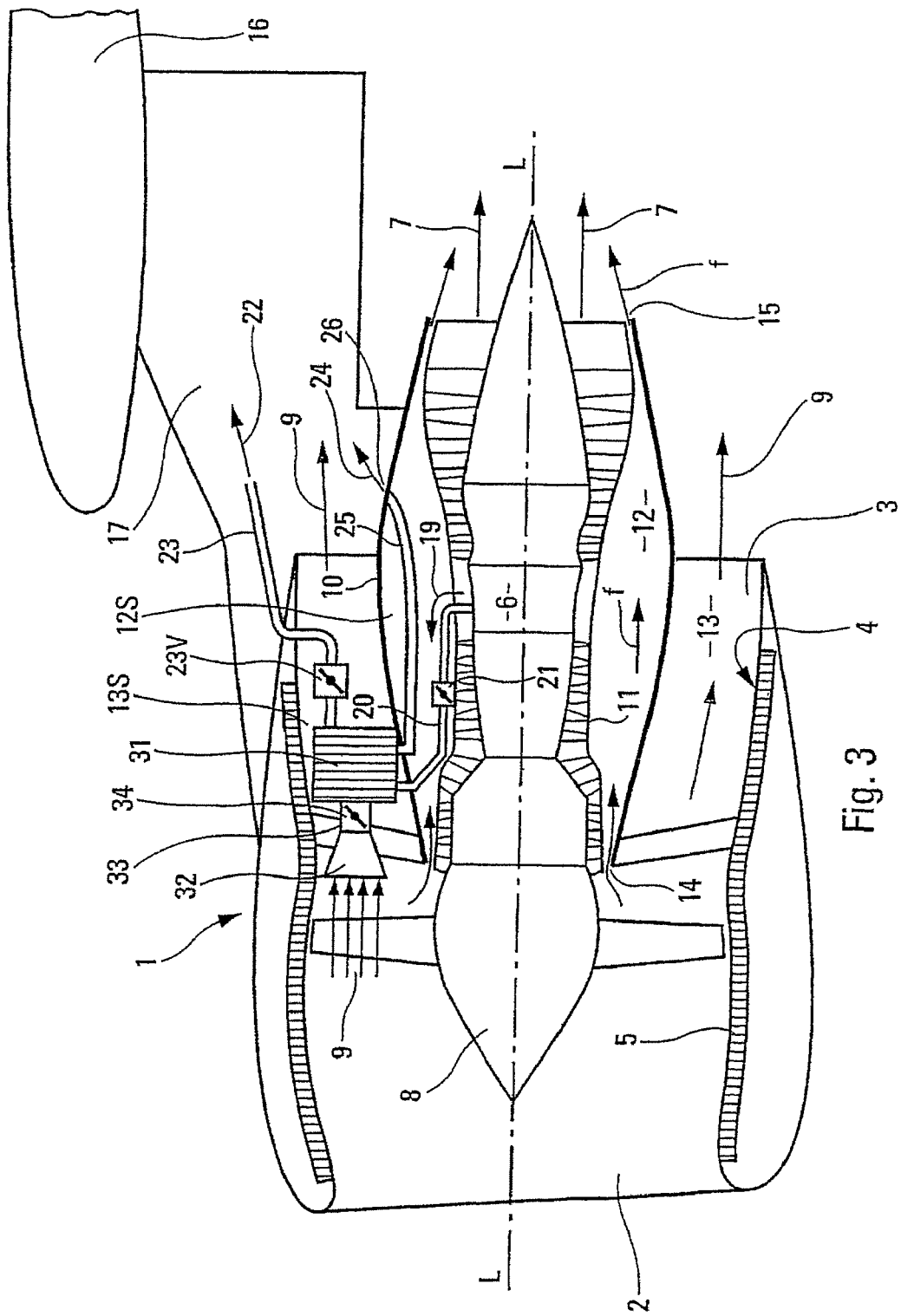
FIGS. 3 and 4 illustrate, in views similar to FIG. 1, two alternative forms of embodiment of the turbine engine according to the present invention.
Figure 4:
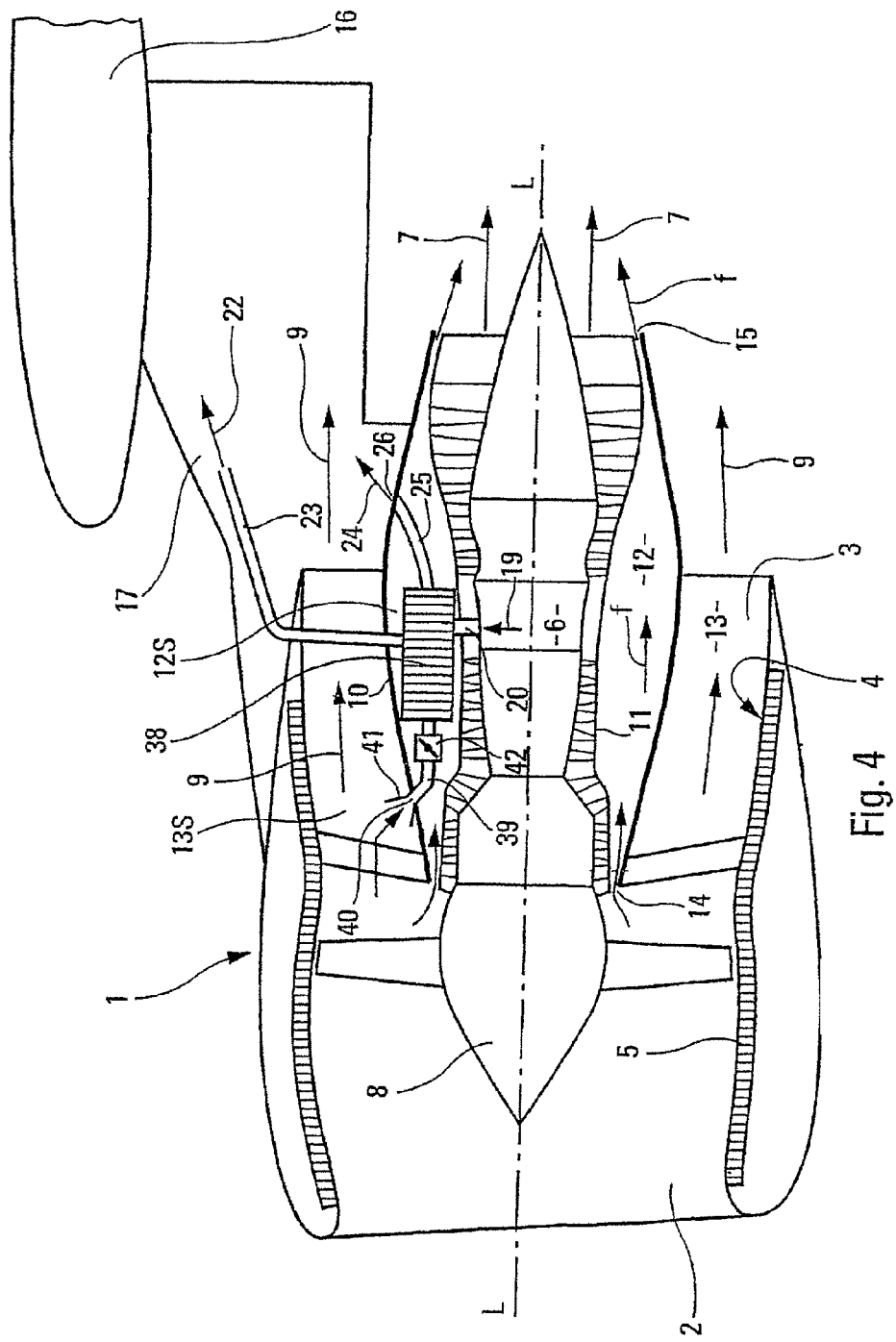

The bypass turbine engine shown by each of FIGS. 1, 3 and 4 comprises a hollow nacelle 1 of longitudinal axis L-L provided with an air intake 2 at the front and with a jet pipe 3 at the rear. Said hollow nacelle 1 internally bears a fairing 4, preferably at least partially coated with acoustic attenuation coatings 5 intended to reduce the internal noise of said turbine engine.

Positioned inside the hollow nacelle 1 are:
- a central hot stream generator 6 comprising, in the known way, low-pressure and high-pressure compressors, a combustion chamber and low-pressure and high-pressure turbines, and which generate the axial hot stream 7 of said turbine engine;
- a fan 8 positioned in front of said central generator 6 and generating the annular cold stream 9 for said turbine engine; and
- an inner fairing 10 surrounding said central generator 6 and forming, between itself and the casing 11 of this generator, a chamber 12 of annular cross section surrounding said generator.

The inner fairing 10 and the fairing 4, external to it, between them form a fan duct 13 of annular cross section surrounding the central generator 6 and through which the cold stream 9 flows.

Formed between the inner fairing 10 and the central generator 6 are, at the front, an annular air intake slot 14 and, at the rear, an annular air discharge slot 15. Thus, the chamber 12 can be swept by a current of cold air f, bled from the cold stream 9 at the front slot 14 and discharged into the hot stream 7 at the rear slot 15, this current of cold air f providing temperature regulation for the central generator 6.

Furthermore, in the usual way, the nacelle 1 is supported by a wing 16 of the aircraft (this wing is depicted in part) via a suspension pylon 17.

In the embodiment of the invention that is illustrated by FIG. 1, a pre-cooler 18 is provided, this being positioned in the upper part 13S of the fan duct 13. This pre-cooler 18 is supplied with hot air 19, from the central generator 6, by a pipe 20 on which there is a hot-air-regulating valve 21. The cooled hot air 22 generated by the pre-cooler 18 is sent to the user equipment (not depicted) through a pipe 23 which passes through the suspension pylon 17 and may be provided with a regulating valve 23V. For its part, the heated cold air 24 generated by the pre-cooler 18 is discharged into the cold stream 9, at the outlet of the jet pipe 3, by a discharge pipe 25 positioned in the annular cross section chamber 12 and connecting the pre-cooler 18 to a discharge orifice 26 made in the inner fairing 10 behind said jet pipe 3, and facing upward at least approximately toward the wing 16 and the pylon 17, that is to say at the upper part of said inner fairing 10.

The pipe 25 is made of a refractory material able to withstand high temperatures, for example of ceramic, and is preferably completely positioned in the upper part 12S of the chamber 12.

Figure 2:
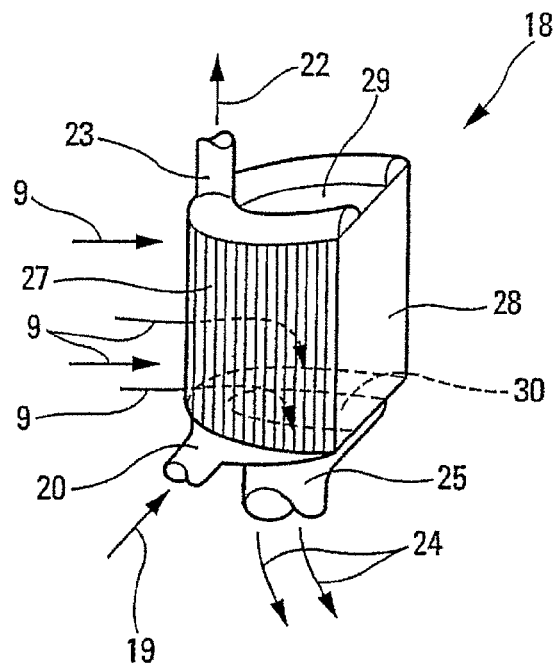
FIG. 2 schematically and in perspective shows an exemplary embodiment of a pre-cooler for the turbine engine of FIG. 1.

The pre-cooler 18 may have the known structure depicted in FIG. 2. In the exemplary embodiment of this FIG. 2, the pre-cooler 18 comprises a collection 27 of exchanger tubes which are supplied in common with hot air 19 by the pipe 20 and which are cooled by the cold stream 9 passing through said collection 27. Said exchanger tubes are connected in common to the pipe 23 through which the current of cooled hot air 22 flows.

The collection of exchanger tubes 27 has, for example, the shape of the stem of a boat and is closed off at the rear by a partition wall 28 so as to form a cavity 29 entered by that part of the cold stream 9 that has passed through said collection 27 and been heated up by the exchanger tubes thereof to form the current of heated cold air 24. The pipe 25 for discharging the current 24 communicates with the cavity 29 via an opening 30 thereof, so that it can carry said current 24 as far as the orifice 26, through the upper part 12S of the chamber 12.

Figure 5:
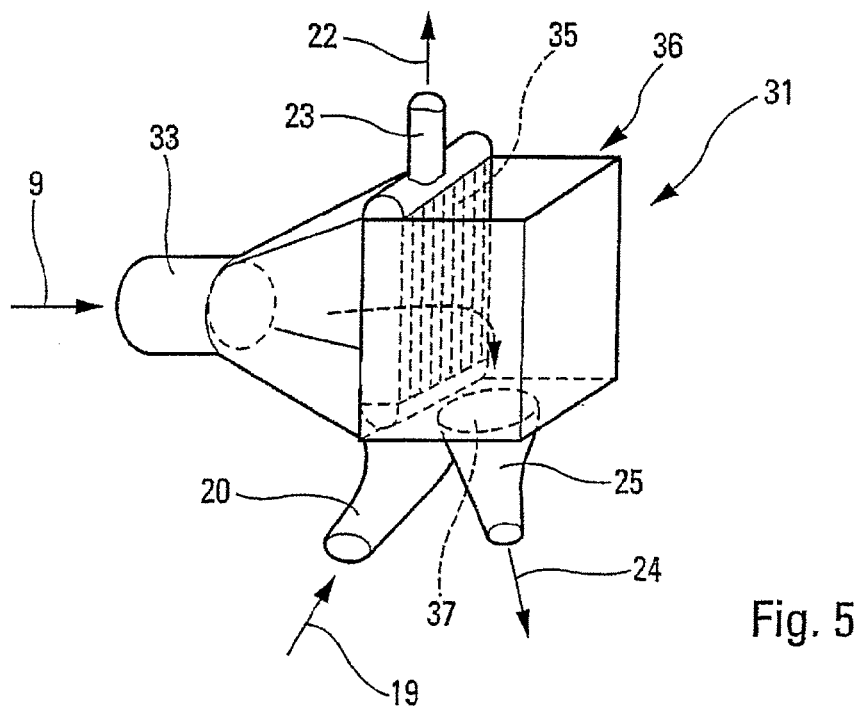
FIG. 5 schematically and in perspective shows one exemplary embodiment of the pre-cooler for the turbine engines of FIGS. 3 and 4.

In the embodiment of the invention illustrated by FIG. 3, we again see all the elements that bear the references 1 to 12, 12S, 13S, 13 to 17, 19 to 26 and 23V and which have been described hereinabove with reference to FIG. 1. However, by comparison with the embodiment of the latter figure, the pre-cooler 18 has been replaced by a pre-cooler 31, an exemplary embodiment of which is illustrated by FIG. 5. In addition, on the fan 8 side, there is a scoop 32 able to bleed some of the cold stream 9 and carry it to the pre-cooler 31 along a pipe 33 provided with a regulating valve 34.

In the example of FIG. 5, the pre-cooler 31 comprises a collection of exchanger tubes 35 which are supplied in common with hot air 19 by the pipe 20 and which are cooled by that part of the cold stream 9 that is picked up by the scoop 32 and carried by the pipe 33. Said exchanger tubes of the collection 35 are connected in common to the pipe 23 through which the current of cooled hot air 22 flows.

The collection of exchanger tubes 35 forms one wall of an enclosure 36 entered by said part of the cold stream 9, picked up by the scoop 32, that has passed through said collection 35 and forms said current of heated cold air 24. The pipe 25 for discharging the current 24 communicates with the enclosure 36 via an opening 37 thereof, so that it can carry said current 24 as far as the orifice 26 through the upper part 12S of the chamber 12.

In the embodiment of the invention illustrated by FIG. 4, we again find all the elements bearing the references 1 to 12, 12S, 13S, 13 to 17, 19, 20 and 22 to 26 and which were described with reference to FIG. 1. In this embodiment, the valves 21 and 23V have been omitted, although they could be present. In addition, by comparison with the embodiment of this FIG. 1, the pre-cooler 18 housed in the upper part 13S of the fan duct 13 has been replaced by a pre-cooler 38 housed in the upper part 12S of the chamber 12. This pre-cooler may be of a similar type to the pre-cooler 31 of FIG. 5.

A bleed pipe 39, positioned at the upper part 12S of the chamber 12, connects the pre-cooler 38 to a bleed orifice 40 made in the forward part of the inner fairing 10. Said bleed orifice 40 is provided with a scoop 41. Thus, part of the cold stream 9, picked up by the orifice 40 and the scoop 41, is carried to the pre-cooler 38 to cool the current of hot air 19 and generate the current of cooled hot air 22 and the current of heated cold air 24. The latter is discharged from the pre-cooler 38 via the pipe 25 which carries it to the orifice 26.

A regulating valve 42 is mounted on the bleed pipe 39 to control the intake of cold air and therefore the temperature of the current of cooled hot air 22.

The invention claimed is:
1. A bypass turbine engine for an aircraft, said turbine engine being suspended from a ycing of the aircraft via a suspension pylon and comprising:
a hollow nacelle of longitudinal axis provided with an air inlet at a front and with a jet pipe at the rear;

a central hot-stream generator, positioned axially in said nacelle;

a fan positioned in said nacelle forward of said central generator and able to generate a cold stream for said turbine engine;

an outer fairing borne internally by said nacelle and an inner fairing surrounding said central generator, said outer and inner fairings between them forming a fan duct of annular cross section for said cold stream, said inner fairing and said central generator delimiting a chamber of annular cross section surrounding said central generator;

a pre-cooler receiving a current of hot air bled from said central generator and a current of cold air bled from said cold stream so as to generate a current of cooled hot air intended for performing functions on board the aircraft, said pre-cooler at a same time generating a current of heated cold air; and at least one discharge orifice for discharging said current of heated cold air, said discharge orifice being made in said inner fairing and facing upward at least approximately toward said wing, wherein said bypass turbine engine comprises at least one discharge pipe positioned in said chamber and connected to said pre-cooler for conducting said current of heated cold air to said at least one discharge orifice and wherein said at least one discharge orifice is positioned behind said jet pipe, such that said heated cold air is discharged into said cold stream at the exit from said turbine engine.

2. The turbine engine as claimed in clam 1, wherein said discharge pipe is substantially positioned in the upper part of said chamber.

3. The turbine engine as claimed in claim 1, wherein said discharge pipe is made of a refractory material able to withstand high temperatures.

4. The turbine engine as claimed in claim 1, wherein said pre-cooler is positioned in said fan duct.

5. The turbine engine as claimed in claim 4, wherein said pre-cooler is subjected to direct action of said cold stream, and a regulating valve is provided on a pipe carrying said current of hot air to said pre-cooler.

6. The turbine engine as claimed in claim 4, wherein a scoop is provided for carrying some of said cold stream to said pre-cooler, and a regulating valve is provided between said scoop and said pre-cooler.

7. The turbine engine as claimed in claim 1, wherein said pre-cooler is positioned in said chamber surrounding said central generator.

8. The turbine engine as claimed in claim 7, wherein, in order to carry said current of cold air to said pre-cooler, there is at least one bleed pipe positioned at least partially in said chamber and connecting said pre-cooler to at least one bleed orifice made in said inner fairing.

9. The turbine engine as claimed in claim 8, wherein said bleed orifice is provided with a scoop.

10. The turbine engine as claimed in claim 8, wherein a regulating valve is provided on said bleed pipe.

* * * * *